Nov. 21, 1961

J. Z. DE LOREAN 3,009,368

TRANSMISSION

Filed Aug. 22, 1957

INVENTOR.
John Z. DeLorean
BY
W. C. Middleton
ATTORNEY

INVENTOR.
John Z. DeLorean
BY
W. C. Middleton
ATTORNEY

Nov. 21, 1961   J. Z. DE LOREAN   3,009,368
TRANSMISSION

Filed Aug. 22, 1957   4 Sheets-Sheet 3

INVENTOR.
John Z. DeLorean
BY
W. C. Middleton
ATTORNEY

United States Patent Office 3,009,368
Patented Nov. 21, 1961

3,009,368
TRANSMISSION
John Z. De Lorean, Birmingham, Mich., assignor to General Motors Corporation, Detroit, Mich., a corporation of Delaware
Filed Aug. 22, 1957, Ser. No. 679,716
22 Claims. (Cl. 74—677)

This invention relates to automatic transmissions of the torque converter combined with planetary gearing type.

An object of this invention is to provide an automatic transmission that is economical to manufacture and simple in design.

It is a further object of this invention to provide an automatic transmission having a torque converter combined with planetary gearing, wherein the torque converter includes a pump or impeller element and a plurality of rotatable turbine elements, one of said turbine elements at times acting as a stationary or reaction member to provide forward drive operation of the torque converter, while at other times rotating reversely as a turbine to provide a reverse drive through the transmission.

It is a still further object of this invention to provide a transmission equipped with a torque converter and planetary gearing, wherein the torque converter consists of a rotatable pump element, a plurality of rotatable turbine elements, and a plurality of stators, wherein one of the stators at times acts as a turbine to rotate the transmission in reverse.

A further object of this invention is to provide an automatic transmission to be located adjacent the rear axle of the vehicle to be driven, thereby eliminating the conventional hump in the center of the front passenger seating compartment.

It is also an object of this invention to provide an automatic transmission having a torque converter located power-wise between two planetary gear sets for economical and efficient operation.

Other features, advantages and objects will become apparent by reference to the detailed description of the invention and to the drawings wherein.

Figure 1:
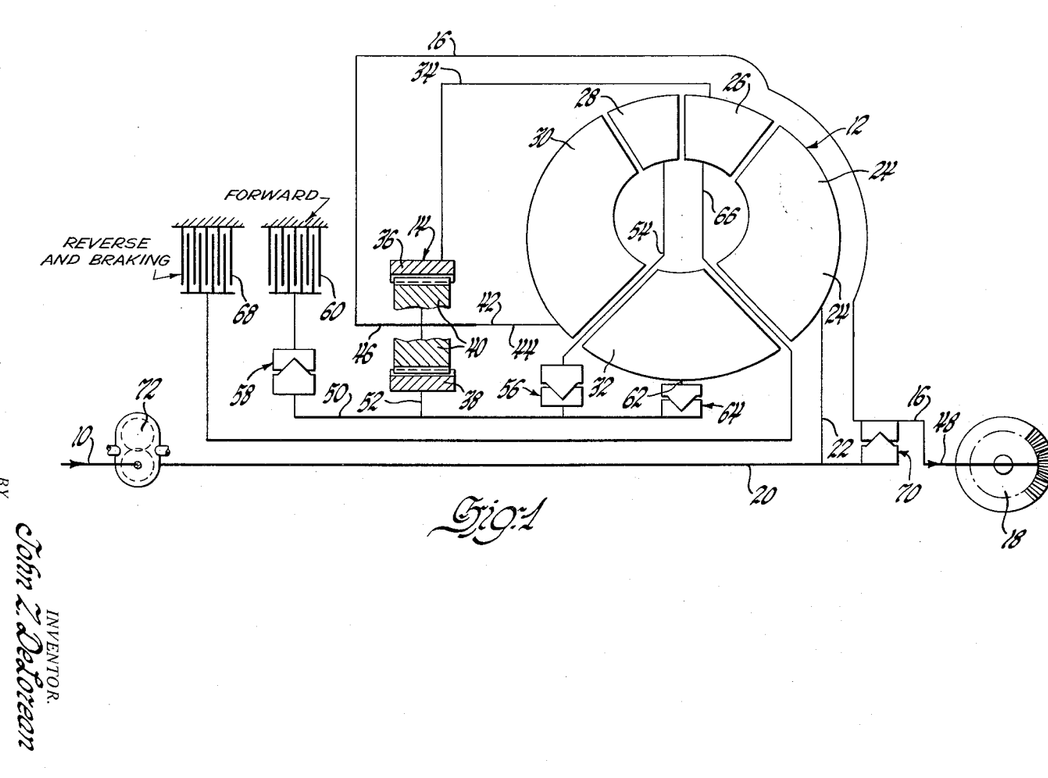
FIGURE 1 is a diagrammatic illustration of a preferred transmission embodying this invention.

Referring now to the drawings and more particularly to FIGURE 1, there is shown therein an input shaft 10 driving a torque converter 12 connected to a planetary gear set 14 to drive an output or driven shaft 16 to be connected to the wheels of the vehicle to be driven by means including gear 18.

Input shaft 10, which can be driven by any suitable source of power, such as an internal combustion engine (not shown), is connected by drive connections 20 and 22 to drive or rotate the pump or impeller element 24 of torque converter 12, which includes a first forwardly rotating turbine 26, a rotatable element 28 acting at times as a stationary or reaction member and at other times as a turbine member, a third rotatable turbine element 30 and a stator member 32. Connected to the first turbine 26 by means of drive connection 34 is the ring gear 36 of the planetary gear set 14 having a sun gear 38, a plurality of pinions 40 meshing with said sun and ring gears, and a carrier 42 drivingly connected to the third turbine element 30 by a drive connection 44. Connected to an extension 46 of the carrier 42 is the output or driven shaft 16, which rotatably surrounds and encloses both the planetary gear set 14 and torque converter 12 and is connected to the wheels to be driven (not shown) by a connection 48 to the gear 18.

For preventing reverse rotation of element 28 and sun gear 38 relative to the forwardly rotating pump element 24, a sleeve shaft 50 is provided, being connected to the sun gear 38 by means of a connection 52, and being connected through the interior of torque converter 12 by connection 54 to the stator-turbine element 28 by means of a one-way engaging device 56 that prevents reverse rotation of element 28 with respect to sleeve shaft 50, but permits forward rotation or overrun of element 28 with respect to sleeve shaft 50. Shaft 50 is prevented from rotating in a direction opposite to the forward direction of rotation of the pump element 24 by means of a one-way brake 58 being connected to a friction brake 60, ine-way brake 58 preventing reverse rotation of sleeve shaft 50 with respect to brake 60, while permitting overrun or overtravel of the said shaft relative thereto in a forward direction. Stator element 32 is likewise connected to sleeve shaft 50 by means of a drive connection 62 and one-way engaging means 64, the one-way means 64 preventing reverse rotation of stator 32 with respect to sleeve shaft 50 while permitting overrun in the forward direction relative thereto.

Connected to the first turbine 26 by means of connection 66 extending through the torque converter is a second brake means 68 for providing a reverse drive through the transmission as will be described later.

Input shaft 10 is connected to output or driven shaft 16 by means of a one-way engaging device 70 which, as seen in FIGURE 1, operates to permit overrun of the engine or input shaft 10 with respect to output shaft 16 while permitting driven shaft 16 to drive input shaft 10, as in the case when the vehicle is stalled and a push start is necessary. As a result, only a front fluid pump 72, secured or splined to input shaft 10, is necessary to supply the fluid necessary to operate the transmission.

Figure 2:
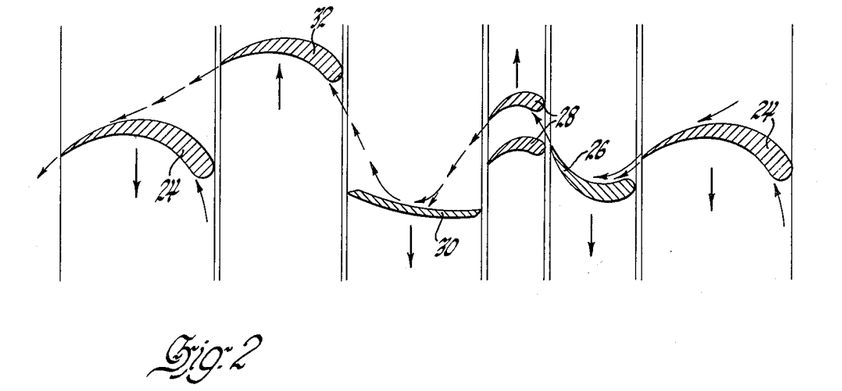
FIGURE 2 is a showing of the blade forms of the torque converter of FIGURE 1 and the fluid flow therethrough at low speeds.

Referring now to FIGURE 2, there is shown therein the pump element 24, first turbine element 26, turbine-stator element 28, turbine 30, and stator 32, having blades of a shape such that at low forward speeds of pump 24, the fluid leaving the pump at its exit end has a direction and velocity sufficient to strike the first turbine element 26 on its underside to rotate thus turbine element forwardly. Fluid leaving turbine 26 will strike the turbine-stator 28 on its concave or backside in a manner attempting to rotate it in a reverse direction, such reverse rotation being prevented by engagement of the one-way engaging means 56, 58 and brake 60. The fluid leaving stator-turbine 28 is then turned and discharged to strike turbine 30 with a velocity and direction tending to rotate this turbine in the same direction as that of the pump, with the fluid leaving the second turbine and striking the stator 32 in the same manner as that of turbine stator 28 to attempt to rotate stator 32 in a reverse direction, such rotation being prevented by means of one-way engaging means 64, 58 and brake 60. The fluid leaving stator 32 is then redirected at a favorable angle to enter the pump element 24 as shown, thereby imposing a forward rotational component of force to add to the forward rotation of the pump.

Figure 2A:
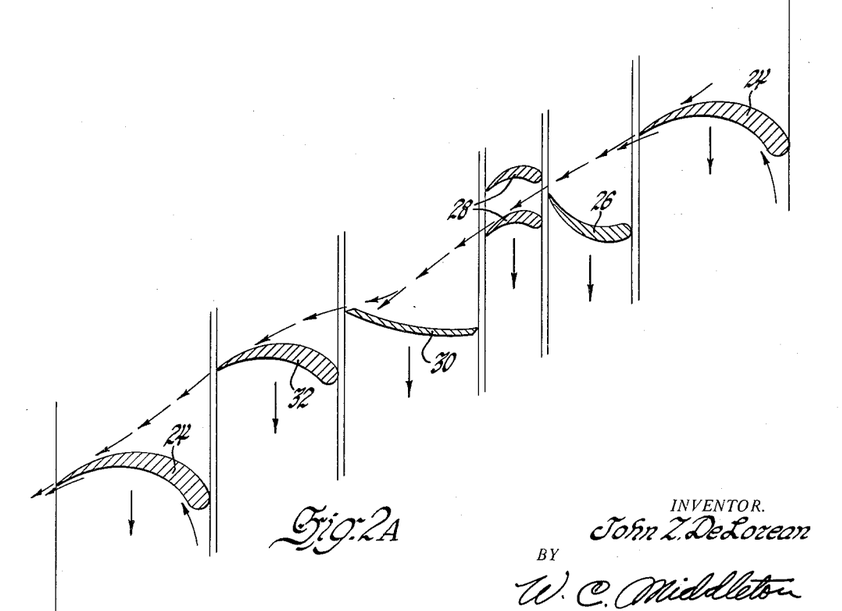
FIGURE 2A is a showing of the fluid flow through the blade forms of FIGURE 2 at higher speeds.

Referring now to FIGURE 2A, at higher speeds of pump 24, turbine 26 will be rotating at such a speed that the angle at which the oil or fluid immerges from this turbine changes to strike the rear or convex face of the turbine-stator blades 28 causing these blades to turn in a forward direction freely because of the release of the one-way engaging means 56, thereby permitting oil to flow unimpeded from the first turbine into the second turbine. This same effect takes place in the case of the second stator 32 upon higher rotations of turbine 30 so that at sufficiently high speeds of the pump, the fluid or oil will flow substantially unimpeded from the pump through the first turbine 26, through turbine stator 28 to the turbine 30, and then back to the pump through the forwardly rotating stator 32.

It will be seen from a consideration of FIGURE 2 that if turbine 26 is held from rotation, the fluid leaving turbine 26 will always strike the stator-turbine 28 in a manner to cause reverse rotation thereof. If turbine-stator 28 is free to rotate in a reverse direction by release of the brake 60, upon increase in speed in a reverse direction of element 28, the fluid will leave turbine 28 at such an angle that it will strike turbine 30 on its convex face thereby rotating turbine 30 in a reverse direction. As will be later described, this reverse rotation of turbine 30 in combination with the planetary gear set constitutes the reverse drive through the transmission.

OPERATION (FIGURE 1)

Neutral

Upon disengagement of brakes 60 and 68, the drive from input or drive shaft 10 to output shaft 16 will be interrupted since gear set 14 will idle freely due to the lack of a reaction member, the one-way engaging means, 56, 58 and 64 merely rotating freely upon the disengagement of brake 60.

Forward

Upon rotation of input or drive shaft 10, and upon application of brake 60 by fluid through suitable conduits (not shown) from input shaft pump 72, with release of second brake means 68, pump element 24 will be rotated in a forward direction to rotate first turbine 26 forwardly thereby rotating ring gear 36 forwardly. Since the carrier 42 is connected to both turbine 30 and the output shaft 16, and the output shaft has thereon a load sufficient to cause the carrier to act temporarily as a stationary member, rotation of the ring gear 36 in a forward direction will attempt to cause sun gear 38 to rotate rearwardly, such rearward rotation being prevented by means of the one-way engaging device 58. Since sun gear 38 cannot rotate rearwardly, the carrier 42, pinions 40 and turbine 30 will therefore be caused to walk around stationary sun gear 38 in a forward direction thereby driving driven shaft 16 forwardly and at a speed reduced from the speed of input shaft 10 and pump 24. Upon increase in speed of turbine 26, the fluid leaving the same will strike element 28, as seen in FIGURE 2, to attempt to cause this element to rotate in a reverse direction, which rotation is prevented by means of the one-way engaging devices 56 and 58. Thus element 28 now acts as a stator or reaction element and the fluid leaving these blades strikes turbine 30 to drive it in a forward direction thereby multiplying the torque through the converter and increasing the drive through the gear set by means of the carrier 42. At higher pump speeds, the speed differential between the pump 24 and turbines 26 and 30 is reduced thereby reducing the speed differential between the ring gear 36 and carrier 42 and reducing the torque reaction on the sun gear 38 until a point is reached wherein this reaction is entirely eliminated. Without any reaction, the carrier 42 will drive the sun gear 38 and ring gear 36 at an overdrive ratio, the sun gear freewheeling or rotating forwardly in the same direction as the pump 24 by the disengagement of the one-way device 58. Thus, the turbine 26 ceases to be effective. Also, as the speeds of the turbines 26 and 30 increase up to the point where turbine 26 will freewheel, the direction of oil flowing into the stators 28 and 32 correspondingly changes toward the rear faces of the stator blades 28 and 32 as seen in FIGURE 2A, gradually eliminating the force holding the stators stationary. The oil against the rear face of the stator blades then causes the stators to rotate forwardly at sufficient speeds so that they do not interfere with the flow of oil between the first and second turbines 26 and 30 and the second turbine 30 and pump 24.

At this stage, turbine 30 will be rotating at approximately pump speed, with turbine 26 and stators 28 and 32 freewheeling, thereby causing the gear set 14 to idle and the shaft 48 to be driven by the carrier 16 at approximately engine speed. The difference in speed between the input shaft 10 and driven shaft 16 will be due to the inherent slip in the torque converter.

Reverse

For reverse operation, brake 60 is disengaged releasing element 28 for reverse rotation and brake 68 is engaged holding first turbine 26 stationary. Rotation of input shaft 10 in a forward direction drives pump element 24 forwardly and, as seen in FIGURE 2, will drive element 28 is a reverse direction to thereby cause one-way device 56 to engage and act as a clutch to drive sun gear 38 reversely, such reverse rotation being permitted by the release of brake 60. Since ring gear 36 is held by its connection to the stationary turbine 26, it will act as a reaction member and reverse rotation of sun gear 38 will cause carrier 42 and pinions 40 to walk around ring gear 36 thereby rotating output shaft 16 and turbine 30 reversely to drive the transmission at a reduction reverse drive. Upon increased reverse rotation of element 28, turbine 30 will have its reverse rotational speed increased because of the direction of fluid flow leaving turbine 28 and striking the back of the blades of turbine 30.

Engine braking

Upon coasting of the vehicle in a forward direction wherein the driven shaft 16 attempts to rotate faster than the drive or input shaft 10, one-way device 70 engages to clutch the driven and drive shafts together to thereby impart an engine braking effect to slow or retard the vehicle.

Also, during high forward speed operation, with the gear set rotating substantially as a unit, and one-way device 58 disengaged, it may be desirable at times to provide additional braking to the output shaft, which may be accomplished by applying brake 68 in addition to brake 60, resulting in braking turbine 26 and ring gear 36 causing carrier 46 to drive sun gear 38 forwardly faster to attempt to drive the already forwardly rotating stator 28 forwardly faster through now engaged one-way devices 56 and 64. However, since turbine 26 stops rotating, the fluid leaving its vanes strikes the forwardly moving vanes of stator 28 in a reverse direction as shown in FIG. 2 in an attempt to rotate it reversely, thereby applying a retarding or braking action through one way device 58 to sun gear 38 and subsequently carrier 46 and output shaft 48.

Figure 3:
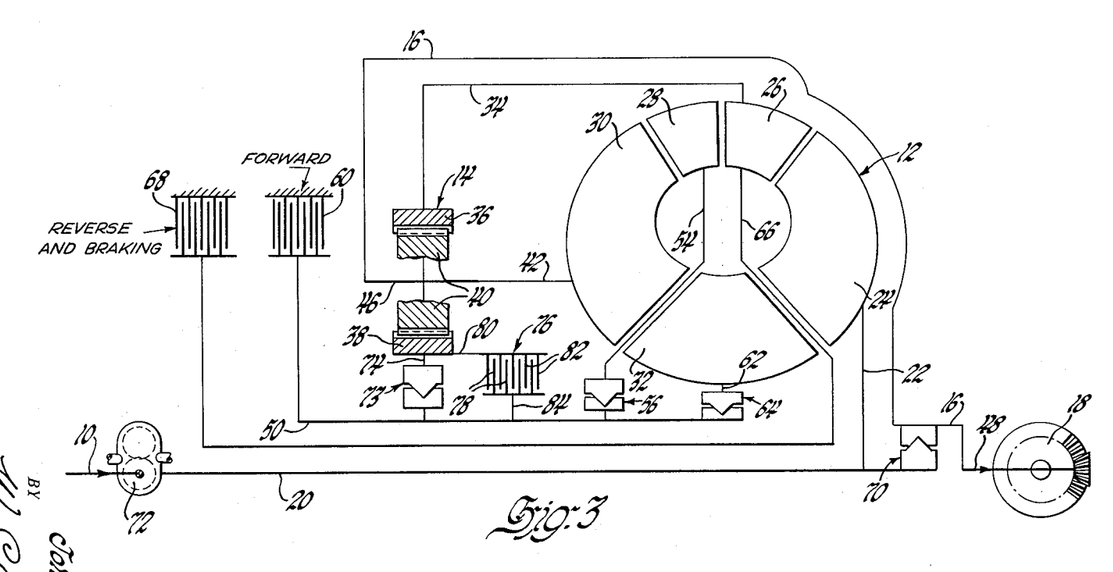
FIGURE 3 is a modification of the transmission of FIGURE 1.

Referring now to FIGURE 3, wherein there is shown a modification of the transmission shown in FIGURE 1, all of the elements of the transmission remain the same except for the connection between the sun gear 38 and the sleeve shaft 50 and the omission of one-way engaging means 58. In this construction, the sun gear is connected in two ways to the sleeve shaft 50, one being through a one-way engaging device 73 by means of a connection 74, the one-way device 73 acting as a brake to prevent reverse rotation of sun gear 38 with respect to sleeve shaft 50 while permitting overrun or overtravel of the sun gear in the same direction as the rotation of pump element 24. The other connection is by means of a friction clutch 76 having a plurality of disks 82 connected to the sun gear 38 by a connection 80 and mating with a plurality of disks 78 connected to sleeve shaft 50 by connection 84. This latter connection is for directly connecting the reversely rotating element 28 and the sun gear 38 in reverse drive and for providing additional forward braking.

OPERATION (FIGURE 3)

Neutral and engine braking

Neutral and engine braking are obtained in this modification in the same manner as that of the embodiment of FIGURE 1 and therefore, it is believed unnecessary to describe the operation again.

Additional braking under high forward speed drive conditions is obtained by disengaging brake 60 and engaging brake 68 and clutch 76 causing the decelerating forwardly rotating stator 28 to apply a braking or retarding action to the forwardly rotating output shaft 48 in a manner similar to that described in connection with the FIGURE 1 construction.

Forward drive

The forward drive operation of this modification is the same as that of the embodiment of FIGURE 1, i.e., forward rotation of ring gear 36 causes reverse rotation of sun gear 38, which is prevented by the one-way engaging means 73 upon application of brake 60, to drive carrier 42 and thus output shaft 16 in a forward direction and at a reduced speed from that of input shaft 10. At higher speeds of pump 24, turbine 26, stators 28 and 32, and sun gear 38 will freewheel rendering the turbine 26 ineffective and idling the gear set as previously described in connection with FIGURE 1, the freewheeling being permitted by the disengagement of one-way devices 56, 64 and 73. Thus turbine 30 will rotate at substantially the same speed as pump 24 to drive output shaft 16 at approximately the speed of input shaft 20 through carrier 42.

Reverse

Reverse is accomplished in substantially the same manner as that of the embodiment of FIGURE 1, with however, the engagement of clutch 76 in addition to the engagement of brake 68 thereby causing sun gear 38 to be rotated reversely upon reverse rotation of element 28 to drive the driven shaft 16 in a reverse direction at a reduced speed from that of the input shaft speed.

Figure 4:
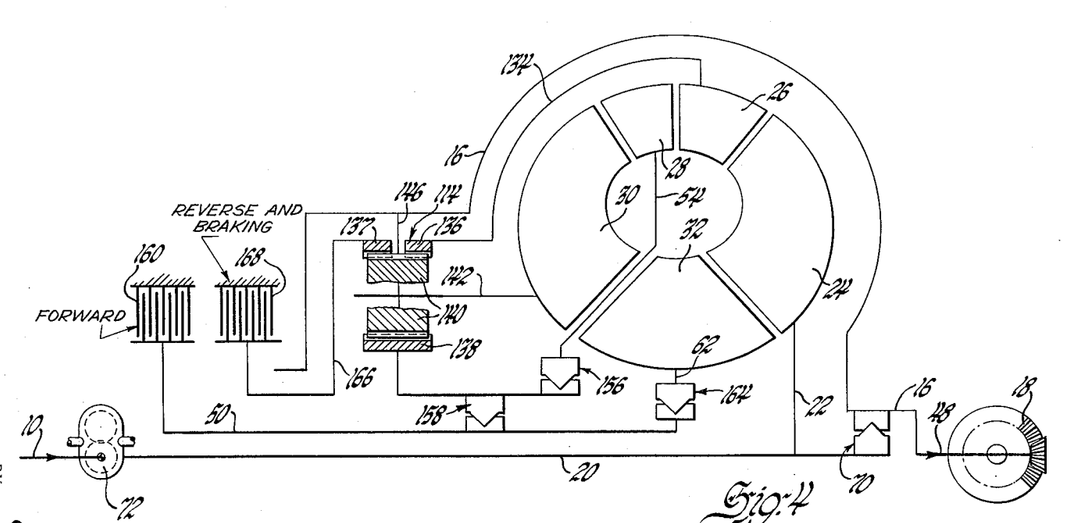
FIGURE 4 is a further modification of the transmission of FIG. 1.

Referring now to FIGURE 4, there is shown therein a modification of the FIGURE 1 transmission. In this figure, the transmission of FIGURE 1 has been rearranged wherein the one-way devices 56, 58 and 64 of FIGURE 1 have been re-located as shown in FIGURE 4 by the one-way devices 156, 158 and 164, respectively. However, the latter-named one-way devices operate in a manner similar to those of the FIG. 1 construction, and therefore, a description of the same will not be repeated.

In FIGURE 4, the first turbine 26 is shown connected by a drive connection 134 to a first ring gear 136 of a planetary gear set 114 having a plurality of planet pinions 140 meshing therewith and with a sun gear 138, the planet pinions 140 being rotatably supported by a carrier 142 connected to the second turbine 30. Also meshing with the planet pinions 140 is a second ring gear 137 having a connection 166 with a fluid pressure actuated friction brake device 168. Ring gear 137 is provided with the same number of teeth as ring gear 136, and therefore, will be moved at the same speed as or held stationary simultaneously with ring gear 136. Connecting the carrier 142 to the output shaft 16 is an extension 146.

OPERATION (FIGURE 4)

Since the operation of the transmission of this figure is similar in all respects to the operation of the transmission of FIG. 1, with the differences between the two embodiments being structural and re-location of parts, i.e., the splitting up of the ring gear into two members 136 and 137 instead of one, and the re-location of the one-way devices 156, 158 and 164, it is not deemed necessary to repeat the operation of this modification.

Figure 5:
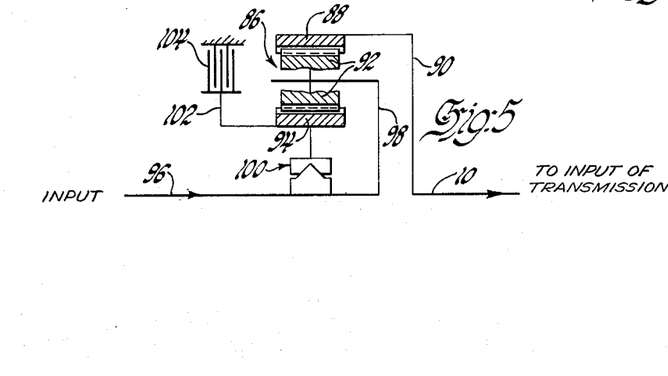
FIGURE 5 is a diagrammatic illustration of an overdrive-direct gear set to be combined with either of the embodiments of FIGURES 1 and 3.

Referring now to FIGURE 5, there is shown therein a gear set 86 adapted to be positioned in front of either of the embodiments of FIGURES 1 and 3 for additional performance over that acquired through the use of the transmissions of FIGURES 1 and 3 alone. This gear set comprises a ring gear 88 having a connection 90 to drive the input or drive shaft 10 of the embodiments of FIGURES 1 and 3. Meshing with ring gear 88 is a plurality of planet pinions 92 in turn meshing with a sun gear 94 rotatably surrounding an input shaft 96 directly connected to a carrier 98 rotatably supporting pinions 92. Provided between sun gear 94 and input shaft 96 is a one-way engaging device or clutch 100 for preventing faster forward rotation of said sun gear relative to said driving carrier 98 while permitting overrun or freewheeling of the carrier with respect to sun gear 94. Attached to sun gear 94 by means of a connection 102 is a brake 104 for holding said sun gear 94 stationary when engaged.

OPERATION (FIGURE 5)

Upon rotation of said input shaft 96 in a clockwise direction as seen from the input shaft end of this embodiment, carrier 98 will be rotated tending to drive ring gear 88 in a clockwise direction. However, since the ring gear 88 is connected by connection 90 to the input shaft 10 of the transmission, and since the transmission is connected to the load through the output shaft 16, the ring gear 88 will be temporarily held stationary to act as a reaction member thereby causing sun gear 94 to attempt to rotate in a forward direction at an overdrive ratio. However, due to the engagement of clutch 100 whenever sun gear 94 attempts to overrun carrier 98, the sun gear 94 and carrier 98 will be locked together thereby locking up the planetary gear set and providing a direct drive from input shaft 96 to drive shaft 10.

At higher vehicle speeds, upon engagement of brake 104 by the vehicle operator admitting fluid thereto, sun gear 94 will be held stationary thereby causing carrier 98 and pinions 92 to walk around sun gear 94 and drive ring gear 88 at an overdrive ratio, thus driving input shaft 10 and pump 24 at an overdrive ratio with respect to the speed of rotation of input shaft 96.

From the foregoing it will be seen that applicant has provided a rear axle automatic transmission that is economical to manufacture and simple and compact in design. It will also be seen that this invention provides an automatic transmission that comprises a torque converter in combination with a single planetary gear set to provide infinite forward speed ratios and reverse ratio. It will also be seen that the invention provides an overdrive-direct gear set that may be conveniently placed in front of the automatic transmission to render said transmission more economical and efficient in operation. It will be seen further that the invention also provides in an automatic transmission having a torque converter, the use of one rotating member of the converter at some times acting as a stator or reaction member to provide forward drive ratios, with said member or element acting as a turbine at other times to provide a drive in reverse through the transmission. It will be understood that the invention can be modified beyond the illustrated embodiments, and therefore, any limitations to be imposed are those set forth in the following claims.

I claim:

1. A transmission comprising an input shaft, an output shaft, and means connecting said shafts, said means including a hydrodynamic drive device and planetary gear means, said drive device including a pump element connected to said input shaft, a plurality of turbine elements and a reaction element, said reaction element being positioned between said turbine elements, said elements being provided with blades of a shape such that low forward speeds of said pump element causes reverse rotation of said reaction element, brake means for said reaction element, and means connecting said reaction element and said brake means for preventing rotation of said reaction element in at least one direction, said gear means including a plurality of rotatable members, brake means for holding one of said turbine elements from rotation, one of said members being connected with one of said turbine elements, a second turbine element being connected to a second one of said members, said second member being connected with said output shaft, and further means connecting a third rotatable member with said reaction element, rotation of said pump element upon application of said reaction element brake means causing rotation of said second member in the same direction as said pump element to drive said output shaft in a forward direction, application of said turbine element brake means with release of said reaction element brake means causing reverse rotation of said output shaft by said second member upon forward rotation of said pump element.

2. A transmission including an input shaft, an output shaft, and means connecting said shafts, said means including a hydrodynamic drive device and planetary gear means, said drive device including a rotatable pump element connected to said input shaft, and a plurality of rotatable turbine elements, said gear means including a ring gear, a sun gear, a plurality of pinions meshing with said sun and ring gears, and a carrier rotatably supporting said pinions, said carrier being connected to said output shaft, said ring gear being connected with one of said turbine elements, said carrier being further connected with another of said turbine elements, means for connecting said sun gear to a third turbine element, brake means for preventing rotation of said first named turbine element, forward rotation of said pump element upon application of said brake means causing reverse rotation of said second and third named turbine elements to drive said carrier and said output shaft in a direction opposite to the direction of rotation of said pump element.

3. A transmission having an input shaft, an output shaft, and means connecting said shafts, said means including a hydrodynamic drive device and planetary gear means, said drive device including a pump element connected to said input shaft and a plurality of rotatable turbine elements together forming a path for the flow of fluid therebetween, said gear means including drive, driven and reaction members, said driven member being connected to said output shaft, means connecting one of said turbine elements with said reaction member, means connecting a second turbine element with said drive member, and means connecting a third turbine element with said driven member, brake means for said one turbine element for holding said reaction member from rotation, said second turbine element being positioned between said first and third turbine elements and being constructed and designed to be rotated reversely to the direction of rotation of said pump element by the fluid discharged thereagainst from said first turbine element at low forward speeds of said pump element, forward rotation of said pump element upon application of said brake means effecting reverse rotation of said second and third turbine elements to rotate said driven member and said output shaft in a direction opposite to the direction of rotation of said pump element.

4. A transmission as in claim 3, wherein said means connecting said second turbine element and said drive member comprises a one-way engaging means permitting overrun of said turbine element in a forward direction with respect to the direction of rotation of said drive member while preventing reverse relative rotation of said drive member with respect to said second turbine element.

5. A transmission including a drive shaft, a driven shaft, and means connecting said shafts, said means including a hydrodynamic drive device and planetary gear means, said drive device including a rotatable pump element connected to said drive shaft and a plurality of rotatable turbine elements, said gear means including a plurality of rotatable members, means connecting a first one of said turbine elements and one of said rotatable members, means connecting a second turbine element and a second one of said rotatable members, and means connecting a third turbine element and a third rotatable member, said third rotatable member being connected with said driven shaft, brake means for preventing rotation of one of said turbine elements, and means connecting said brake means and said latter turbine element, said means comprising one-way engaging means, said one-way engaging means permitting overrun in a forward direction of said latter-named turbine element with respect to the second-named rotatable member while preventing rotation in a reverse direction relative to said second-named rotatable member, second brake means for preventing rotation of said first turbine element, said first turbine element being positioned adjacent said pump element, engagement of said first turbine element brake means with release of said other turbine element brake means and rotation of said pump element in a forward direction causing reverse rotation of said second and third turbine elements to drive said driven shaft in a direction opposite to the direction of rotation of said pump element, engagement of said other turbine element brake means and release of said first turbine element brake means with rotation of said pump element in a forward direction causing forward rotation of said first and third turbine elements to drive said driven shaft in the same direction as the direction of rotation of said pump element.

6. A transmission including a drive shaft, a driven shaft, and means connecting said shafts, said means including a pump element and a plurality of turbine elements, said gear means including a sun gear, a ring gear, and a plurality of pinions meshing with said sun and ring gears, a carrier for said pinions connected to said driven shaft, said pump element being connected to said drive shaft, a first turbine element connected to said ring gear, a third turbine element connected to said carrier, and brake means for preventing rotation of a second turbine element in at least one direction, said brake means including a one-way engaging device to permit overrun of said second turbine member in a forward direction with respect to said brake means while preventing reverse rotation of said second turbine with respect to said brake means, and means connecting said sun gear and said brake means, said latter-named means including a plurality of engageable devices, one of said devices comprising a one-way engaging means to prevent reverse rotation of said sun gear with respect to said brake means, another of said devices including clutch means to directly connect said second turbine element and said sun gear, second brake means for preventing rotation of said first turbine element, rotation of said pump element in a forward direction upon engagement of said second brake means and said clutch means causing reverse rotation of said turbine element to drive said sun gear, carrier and said third turbine element in a direction opposite to that of the pump element to drive said driven shaft in a reverse direction.

7. A transmission as in claim 6, wherein said second turbine element is positioned between said first and third turbine elements in the path of fluid flow.

8. A transmission including an input shaft, an output shaft, and means connecting said shafts, said means including a hydrodynamic drive device and planetary gear means, said drive device including a rotatable pump element connected to said input shaft, and a plurality of rotatable turbine elements, said gear means including a plurality of ring gears, a sun gear, a plurality of pinions meshing with said sun and ring gears, and a carrier rotatably supporting said pinions, said carrier being connected to said output shaft, one of said ring gears being connected with one of said turbines, said carrier being further connected with another of said turbines, means for connecting said sun gear to a third turbine element, brake means for preventing rotation of another of said ring gears, forward rotation of said pump element upon application of said brake means causing reverse rotation of said second and third named turbine elements to drive said carrier and said output shaft in a direction opposite to the direction of rotation of said pump element.

9. A transmission having a drive shaft, a driven shaft, and means connecting said shafts, said means including a hydrodynamic drive device and gear means, said drive device comprising a hydraulic torque converter having a rotatable pump secured to said drive shaft, a plurality of relatively rotatable turbines, and a plurality of stators, said pump, turbines and stators cooperating together to define a fluid flow circuit therebetween, one of said stators being positioned between turbines, another of said stators being positioned between one of said turbines and said pump, said gear means comprising a sun gear, a ring gear, a plurality of pinions meshing with said sun and ring gears, and a carrier rotatably supporting said pinions, means connecting said carrier to said driven shaft and said one turbine, means connecting another of said turbines and said ring gear, actuatable means to prevent rotation of said another turbine, actuatable means connecting said stators and said sun gear providing a reverse drive through said transmission upon actuation of both of said actuatable means and reverse rotation of said stators, and brake means preventing rotation of said sun gear providing a forward reduction drive through said transmission upon forward rotation of said pump by said drive shaft, said brake means including one-way and two-way engageable means to prevent rotation of portions of said brake means in one and both directions of rotation respectively.

10. A transmission having a drive shaft, a driven shaft, and means connecting said shafts, said means including a hydrodynamic drive device and gear means, said drive device comprising a hydraulic torque converter having a rotatable pump secured to said drive shaft, a plurality of relatively rotatable turbines, and a plurality of stators, said pump, turbines and stators cooperating together to define a fluid flow circuit therebetween, one of said stators being positioned between turbines, another of said stators being positioned between one of said turbines and said pump, said gear means comprising a sun gear, a ring gear, a plurality of pinions meshing with said sun and ring gears, and a carrier rotatably supporting said pinions, means connecting said carrier to said driven shaft and said turbine, means connecting another of said turbines and said ring gear, means connecting said stators and said sun gear, and brake means preventing rotation of said sun gear and providing a forward reduction drive through said transmission upon forward rotation of said pump by said drive shaft, and second brake means preventing rotation of said another of said turbines and effecting another forward reduction drive through and a braking action to said transmission upon application of both of said brake means.

11. A transmission including an input shaft, an output shaft, and means connecting said shafts, said means including a hydrodynamic drive device and planetary gear means, said drive device including a rotatable pump element connected to said input shaft, and a plurality of rotatable turbine elements, said gear means including a ring gear, a sun gear, a plurality of pinions meshing with said sun and ring gears, and a carrier rotatably supporting said pinions, said carrier being connected to said output shaft, said ring gear being connected with one of said turbine elements, said carrier being further connected with another of said turbine elements, means for connecting said sun gear to a third turbine element, first brake means for preventing rotation of said first named turbine element, other brake means preventing rotation of said sun gear, the application of said first and other brake means at higher forward rotational speeds of said pump element effecting a forward reduction drive through said transmission, forward rotation of said pump element upon application of said first brake means with release of said other brake means causing reverse rotation of said second and third named turbine elements to drive said carrier and said output shaft in a direction opposite to the direction of rotation of said pump element.

12. A transmission comprising an input shaft, an output shaft, and means connecting said shafts, said means including a hydrodynamic drive device and planetary gear means, said drive device including a pump element connected to said input shaft, a plurality of turbine elements and a reaction element, said reaction element being positioned between said turbine elements, brake means for said reaction element, and means connecting said reaction element and said brake means for preventing rotation of said reaction element in at least one direction, said gear means including a plurality of rotatable members, brake means for holding one of said turbine elements from rotation, one of said members being connected with one of said turbine elements, a second turbine element being connected to a second one of said members, said second member being connected with said output shaft, and further means connecting a third rotatable member with said reaction element, rotation of said pump element upon application of said reaction element brake means causing rotation of said second member in the same direction as said pump element to drive said output shaft in a forward direction, application of said turbine element brake means with release of said reaction element brake means causing reverse rotation of said output shaft by said second member upon forward rotation of said pump element, application of said reaction element brake means and said turbine element brake means at higher forward rotational speeds of said pump element causing a reduction forward drive through and a braking action to said transmission.

13. A transmission having an input shaft, an output shaft, and means connecting said shafts, said means including a hydrodynamic drive device and planetary gear means, said drive device including a pump element connected to said input shaft and a plurality of rotatable turbine elements, said gear means including drive, driven and reaction members, said driven member being connected to said output shaft, means connecting one of said turbine elements with said reaction member, means connecting a second turbine element with said drive member, and means connecting a third turbine element with said driven member, first brake means for said one turbine element for holding said reaction member from rotation, said second turbine element being positioned between said first and third turbine elements, other brake means for said second turbine element, application of said first and other brake means upon higher forward rotation of said pump element effecting a reduction drive through and a braking action to said transmission.

14. A transmission including a drive shaft, a driven shaft, and means connecting said shafts, said means including a hydrodynamic drive device and planetary gear means, said drive device including a rotatable pump element connected to said drive shaft and a plurality of rotatable turbine elements, said gear means including a plurality of rotatable members, means connecting a first one of said turbine elements and one of said rotatable members, means connecting a second turbine element and a second one of said rotatable members, and means connecting a third turbine element and a third rotatable member, said third rotatable member being connected with said driven shaft, brake means for preventing rotation of one of said turbine elements, and means connecting said brake means and said latter turbine element, said means comprising one-way engaging means, said one-way engaging means permitting overrun in a forward direction of said later-named turbine element with respect to the second-named rotatable member while preventing rotation in a reverse direction relative to said second-named rotatable member, second brake means for preventing rotation of said first turbine element, said first turbine element being positioned adjacent said pump element, engagement of said first turbine element brake means with release of said other turbine element brake means and rotation of said pump element in a forward direction causing reverse rotation of said second and third turbine elements to drive said driven shaft in a direction opposite to the direction of rotation of said pump element, engagement of said other turbine element brake means and release of said first turbine element brake means with rotation of said pump element in a forward direction causing forward rotation of said first and third turbine elements to drive said driven shaft in the same direction as the direction of rotation of said pump element, engagement of both said first turbine element brake means and said other turbine element brake means at higher forward rotational speeds of said pump element causing a forward reduction drive through and a braking action to said transmission.

15. A transmission having a drive shaft, a driven shaft and means connecting said shafts, said means including a hydrodynamic drive device and gear means, said drive device including a rotatable pump connected to said drive shaft and a plurality of rotatable turbines, said gear means including drive, driven and reaction members, means connecting said driven member to said driven shaft and to one of said turbines, means connecting another of said turbines to said drive member, brake means preventing rotation of said another of said turbines, and other brake means preventing rotation of said reaction member effecting a forward reduction drive through said transmission upon forward rotation of said pump, engagement of said first and other brake means at higher rotational speeds of said pump effecting a further forward reduction drive through said transmission.

16. A transmission having a drive shaft, a driven shaft, and means connecting said shafts, said means including a hydrodynamic drive device and gear means, said drive device comprising a rotatable pump secured to said drive shaft, a plurality of relatively rotatable turbines, and a plurality of stators, said pump, turbines and stators cooperating together to define a fluid flow circuit therebetween, said gear means comprising a sun gear, a ring gear, a plurality of pinions meshing with said sun and ring gears, and a carrier rotatably supporting said pinions, means connecting said carried to said driven shaft and one of said turbines, means connecting another of said turbines and said ring gear, means connecting said stators and said sun gear, and brake means preventing rotation of said sun gear and providing a forward reduction drive through said transmission upon forward rotation of said pump by said drive shaft, and second brake means preventing rotation of said another of said turbines and effecting another forward reduction drive through and a braking action to said transmission upon application of both of said brake means.

17. In a transmission, the combination of an input member, an output member, a hydraulic torque converter comprising an impeller driven from said input member and a stator or reaction element and first and second turbine or driven elements, and means including a planetary gear set for connecting said first and second turbine elements with said output member for driving said output member in the forward direction, a brake for said first turbine element so that said second turbine element and said stator tend to rotate in the reverse direction when said impeller is driven in the forward direction, and means including said planetary gear set for connecting both said second turbine and said stator elements with said output member when said brake is engaged for driving said output member in the reverse direction.

18. In a transmission, the combination of an input member, an output member, a hydraulic torque converter comprising an impeller driven from said input member and a stator or reaction element and first and second turbine or driven elements, a planetary gear set comprising three interconnected elements a first one of which is connected with said output member, means for drivingly connecting said second turbine element with said first planet gear element and said output member, means for drivingly connecting said first turbine element and a second one of said planet gear set elements, means for braking the third one of said planet set elements and said stator so that said first and second turbine elements are operative to drive said output member, a brake for said first turbine element so that said second turbine element and said stator element tend to rotate in the reverse direction when said impeller is driven in the forward direction, and means for drivingly connecting said third planetary set element with said stator element so that both said second turbine element and said stator element are effective to drive said output member in the reverse direction when said brake is engaged.

19. In a transmission, the combination of an input member, an output member, a hydraulic torque converter comprising an impeller driven from said input member and a stator or reaction element and first and second turbine or driven elements, a planetary gear set comprising a sun gear and a ring gear and a planet gear in mesh with said sun and ring gears and a planet gear carrier, said carrier being connected to said driven member, braking mechanism for said sun gear and said stator, means drivingly connecting said first turbine element and said ring gear for driving said output member at initial low speed when said braking mechanism is operative, means drivingly connecting said second turbine element to said carrier and output member for driving said output member at a higher speed, and a second braking mechanism for said first turbine element so that said second turbine element and said stator element tend to rotate in the reverse direction when said impeller is driven in the forward direction, and means for drivingly connecting said stator element and said sun gear so that said second turbine and said stator elements both are effective for driving said output member when said second named braking mechanism is engaged.

20. In a transmission, the combination of an input member, an output member, a hydraulic torque converter comprising an impeller driven from said input member and a stator or reaction element and first and second turbine or driven elements, a planetary gear set comprising three drivingly interconnected elements a first one of which is connected to said output member, means for drivingly connecting said first turbine element to a second one of said planetary elements, means for drivingly connecting said second turbine element to said first planetary element, a friction brake, a one-way engaging device between said friction brake and the third one of said planetary elements and a one-way engaging device between said friction brake and said stator element so that said friction brake is effective for braking said stator and said third planetary element for completing a drive through the transmission, and a clutch in parallel with said one-way engaging device for said third planetary element for providing an engine braking condition in which a power train is completed from said output member to said input member without over-running action of said last named one-way engaging device.

21. In a transmission, the combination of an input member, an output member, a hydraulic torque converter comprising an impeller driven from said input member and a stator or reaction element and first and second turbine or driven elements, a planetary gear set comprising a sun gear and a ring gear and a planet gear in mesh with said sun and ring gears and a planet gear carrier, means drivingly connecting said first turbine element and said ring gear, means drivingly connecting said second turbine element and said carrier and said output member, a friction brake connected by means of a one-way engaging device with said stator element for holding the stator element against reverse rotation, a one-way engaging device connecting said friction brake and said sun gear for completing a forward drive from said first turbine element through said planetary set to said output member prior to a drive from said second turbine directly to said output member, and a friction clutch connected across said second named one way engaging device for providing a two-way drive from said output member to said input member.

22. In a transmission, the combination of an input member, an output member, a hydrodynamic coupling device comprising an impeller driven from said input member and first and second turbine or driven elements, a planetary gear set comprising three interconnected elements one of which is connected with said output member, a one-way engaging device for holding a second one of said planetary elements from rotation in the reverse direction, means drivingly connecting said second turbine element and said output member, means drivingly connecting said first turbine element and the third one of said planetary elements so that said first turbine element drives said output member when said one-way device is engaged and said second turbine element drives said output member on the disengagement of said one-way device, and a brake for said third planetary element for braking said first turbine element causing said second turbine element to tend to rotate in the reverse direction with a disengagement of said one-way device for providing a braking action on said output member.

References Cited in the file of this patent

UNITED STATES PATENTS

| | | |
|---|---|---|
| 2,361,105 | Jandasek | Oct. 24, 1944 |
| 2,695,533 | Pollard | Nov. 30, 1954 |
| 2,737,827 | Seybold | Mar. 13, 1956 |
| 2,782,659 | Kelley | Feb. 26, 1957 |
| 2,803,974 | Kelley | Aug. 27, 1957 |
| 2,820,373 | Dodge | Jan. 21, 1958 |

FOREIGN PATENTS

| | | |
|---|---|---|
| 761,810 | Great Britain | Nov. 21, 1956 |

UNITED STATES PATENT OFFICE
CERTIFICATE OF CORRECTION

Patent No. 3,009,368                            November 21, 1961

John Z. De Lorean

It is hereby certified that error appears in the above numbered patent requiring correction and that the said Letters Patent should read as corrected below.

Column 2, line 23, for "ine-way" read -- one-way --; column 4, line 22, for "is" read -- in --; column 10, line 72, for "later-named" read -- latter-named --; column 11, line 46, for "carried" read -- carrier --.

Signed and sealed this 8th day of May 1962.

(SEAL)
Attest:

ERNEST W. SWIDER
Attesting Officer

DAVID L. LADD
Commissioner of Patents